United States Patent [19]
Gidge

[11] 3,870,583
[45] Mar. 11, 1975

[54] PRE-FORMED, MULCH CARPET AND APPARATUS AND METHOD FOR MAKING SAME
[75] Inventor: Lester Gidge, Nashua, N.H.
[73] Assignee: Terra-Tex Corporation, Nashua, N.H.
[22] Filed: Apr. 17, 1973
[21] Appl. No.: 352,040

Related U.S. Application Data
[62] Division of Ser. No. 160,425, July 7, 1971, abandoned.

[52] U.S. Cl............ 156/500, 29/121 R, 47/9, 47/48.5, 156/61, 156/82, 156/219, 156/268, 156/277, 156/388, 156/497, 156/510, 156/582, 241/65, 425/362
[51] Int. Cl............................................. B29b 1/12
[58] Field of Search....... 156/61, 82, 219, 209, 582, 156/268, 388, 497, 500, 510, 247, 277; 29/121 R; 264/109, 120, 122, 119; 47/48.5, 9; 241/65; 425/362

[56] References Cited
UNITED STATES PATENTS
2,464,301  3/1949  Francis ........................... 264/119 X
2,740,233  4/1956  Reynolds ............................... 47/9
2,803,577  8/1957  Colt et al. ....................... 264/119 X
2,949,698  8/1960  Downey et al. .......................... 47/9
3,284,209  11/1966  Kelley .................................. 47/56
3,493,528  2/1970  Rakszawski et al. ............ 264/122 X
3,555,728  1/1971  Herns ................................... 47/9
3,707,056  12/1972  Cole et al. ............................ 47/9

Primary Examiner—Edward G. Whitby
Attorney, Agent, or Firm—Pearson & Pearson

[57] ABSTRACT

A low cost, flexible, opaque, mulch carpet is pre-formed of natural mulch material, such as bark particles of redwood, Douglas fir, or other conifers or hard woods, mixed with a resin binder, the mixture being molded in pockets of a pattern roll to form an irregular, grooved, natural-appearing, mulch layer. A strong, tear resistant layer of non-rotting material, such as a cohesive mat of natural, or synthetic, fibres, is adhered to the back of the mulch layer. The backing is porous, or apertured, under and connecting with the grooves of the mulch layer for transpiration and seepage of moisture. Pre-formed enclosures in the ground cover may contain heavy particles or may be flat, apertured, garden hose, woven soaker hose, or fibrous conduit, for irrigation or meniscus type wetting.

11 Claims, 14 Drawing Figures

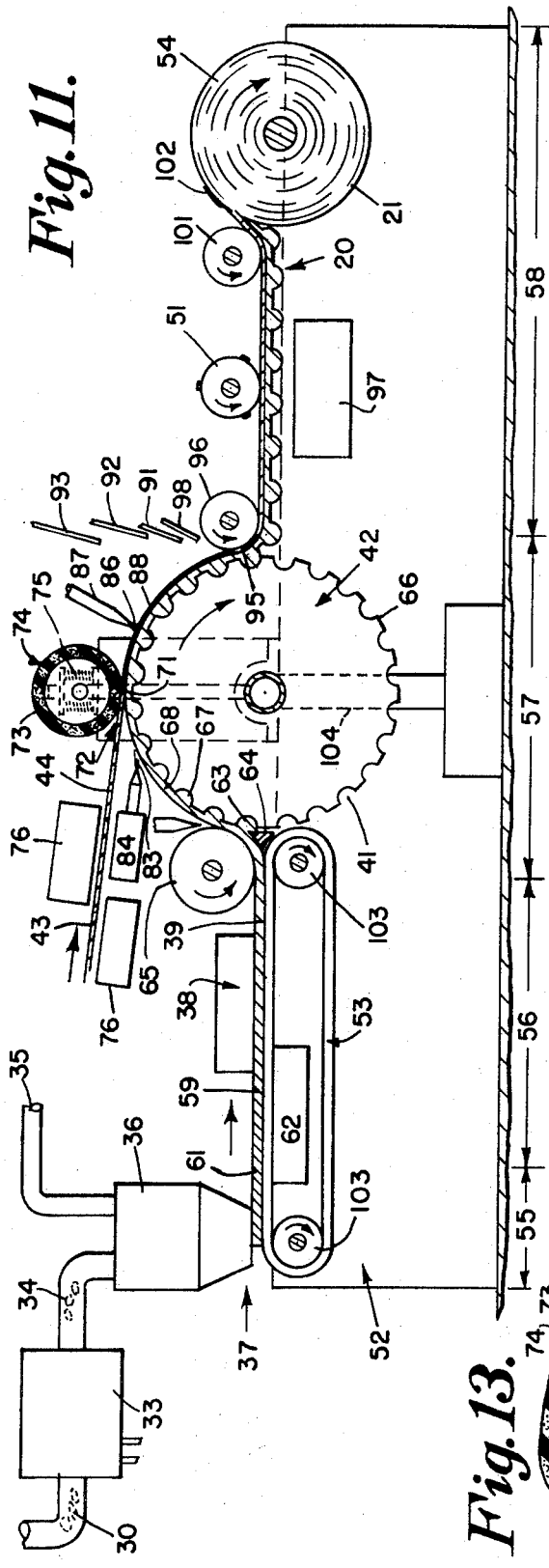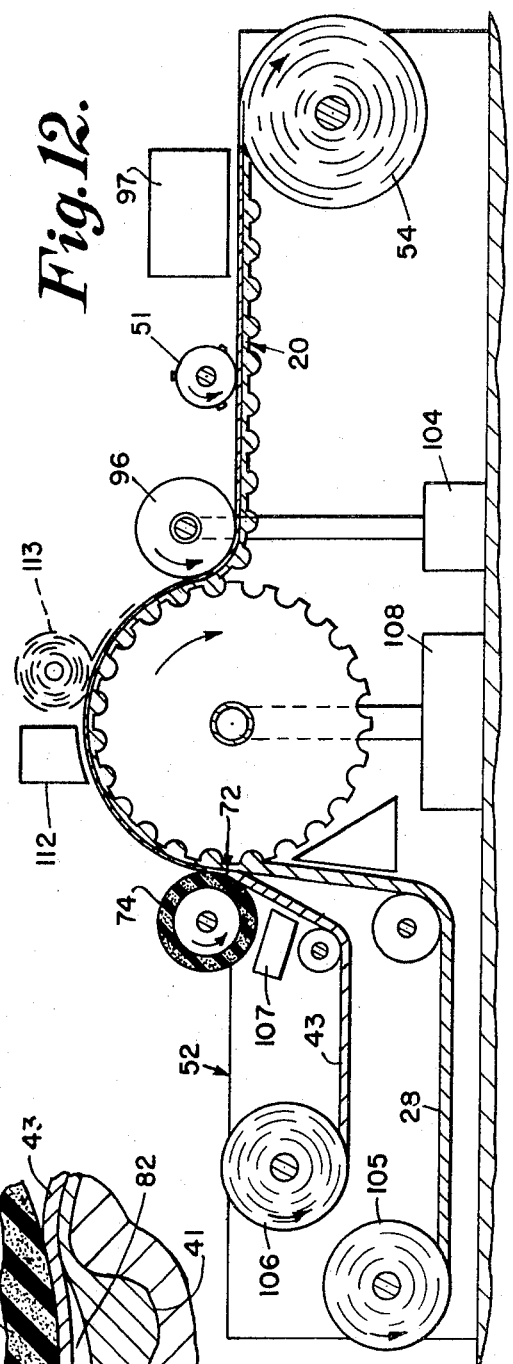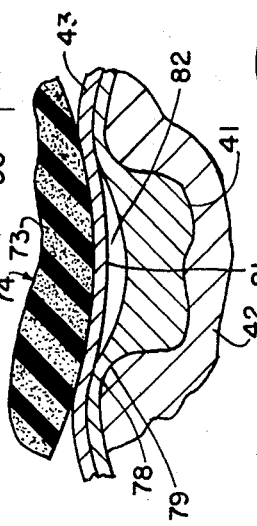

PRE-FORMED, MULCH CARPET AND APPARATUS AND METHOD FOR MAKING SAME

This application is a division of my application Ser. No. 160,425 of July 7, 1971 now abandoned and is related to the continuation thereof Ser. No. 433,861 filed Jan. 16, 1974.

PRIOR ART

It has long been proposed to use plastic sheeting, either clear or opaque, as a mulch for growing crops in place of the more bulky and costly organic mulches. Clear plastic increases soil heat but does not prevent weed growth. Opaque plastic prevents weed growth but increases soil heat only slightly.

In addition to plastic sheet mulches, paper has been suggested for the purpose, as in U.S. Pat. No. 1,954,424 to Otwell of Apr. 10, 1934, and U.S. Pat. No. 1,870,110 to Hall of Aug. 2, 1932. Slitted tar paper is proposed in U.S. Pat. No. 1,110,377 to Cowler of Sept. 15, 1914, and U.s. Pat. No. 1,372,996 to Eckart of Mar. 29, 1921. Thin, inflexible, cement blocks with plant cut-outs are suggested in U.S. Pat. No. 2,662,343 to Rice of Dec. 15, 1953, and U.S. Pat. No. 3,439,450 to Richards of Apr. 22, 1969.

However, all of the above expedients, as well as the artificial mulch products disclosed in many other patents, have tended to produce a mulch, or ground cover, with a regular, relatively smooth surface not found in nature and lacking in one desirable characteristic or another. For example, paper and tar paper are unmistakably cheap in appearance on a garden or around shrubs; rigid blocks cannot be rolled up and produce a hard, unnatural impression; while shiny, reflective plastic sheeting not only must be anchored by ground staples or dirt but is associated with throw-away garment bags and other disposable items.

SUMMARY OF THIS INVENTION

In this invention a low cost, but natural appearing mulch carpet is pre-formed and fabricated on continuous production machinery in the form of a flexible, opaque web of indefinite length, strong enough to last for several years of outdoor exposure and yet capable of being slit with ordinary hand scissors to fit around existing flowers, shrubs, or trees. The mulch carpet of the invention is limp and flexible enough to conform to ground contour, heavy enough to remain in place once installed and natural enough in appearance to resemble the organic type mulches such as redwood bark chips, or peat moss, or the inorganic type ground cover, such as gravel, or stone chips, now much used in horticultural show displays and in carefully landscaped small or large estates and parks. The invention is characterized by combining natural appearing mulch particles such as bark having a desirable hue, preferably pre-heated to set the hue, and which normally would blow away, or be raked away when used, with a suitable resin binder to encapsulate the particles in the flexible plastic and form a relatively weak, limp, opaque, flexible layer molded into irregular, ribbed, mounded and grooved natural mulch appearing surface. The mulch layer is affixed to a backing layer of non-rotting material and considerable tensile strength which may be of plastic sheeting, but which preferably is a strong fibrous mat adhered by one or more spray coatings of asphalt or other coatings to the mulch layer. A preferred practice is to dust these coatings with fine particulates to conceal the coating and act as a non-sticking barrier. The mulch carpet thus looks like a ground cover of natural mulch but may be raked, swept, vacuumed or hosed clear of leaves despite its irregular grooved surface, may be stepped upon, and may be rolled up when not used, all while inhibiting weed growth, protecting worm life, permitting moisture to pass through and keeping the roots of the plants cool and insulated from the sun. The natural resiliency of the cells of tree bark mulch permits the carpet of the invention to remain outdoors in hot or cold climates without damage. The tree bark contains its own preservatives and insect deterrents and maintains its insulative cellular structure despite continued exposure to ground moisture so that it is much preferred as the mulch material of the invention.

In the method of the invention, it has been found advantageous to heat the bark particles up to about 500°F for a predetermined period to darken or char the particles to a hue, or color, which will remain fast for a long time. As is well known, redwood chips or bark exposed to the sun quickly turn a silver gray and the pre-heat step avoids such color loss.

BRIEF DESCRIPTION OF THE DRAWINGS

FIG. 11 is a diagrammatic side elevation of one embodiment of the apparatus of the invention;

FIG. 12 is a similar view of another embodiment of the apparatus of the invention;

FIG. 13 is an enlarged fragmentary side elevation of the pattern roll and compression roll nip of the apparatus.

DESCRIPTION OF PREFERRED EMBODIMENTS

Figure 1:
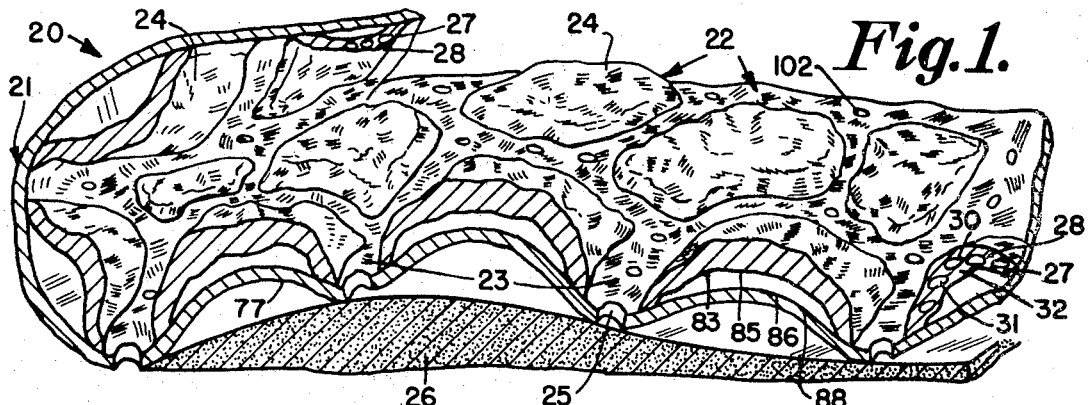
FIG. 1 is a perspective view, in section, of the preferred embodiment of the mulch carpet of the invention.

As shown in the drawings, the low cost, flexible, opaque, mulch carpet 20 of the invention can be rolled up, or bent, as at 21 and otherwise can be easily stored, shipped, handled, applied and cut while still presenting the outward appearance of loosely laid natural mulch particles such as redwood bark or chips, peat moss, gravel or the like. Mulch carpet 20 is pre-formed and fabricated with a rough, irregular, undulating, three-dimensional, outer surface 22, arranged in a predetermined pattern which guides rain water into the grooves, or channels, 23 between the nodes, or knobs, 24 of the undulations and thence through seepage, or transpiration, apertures 25 into the ground 26.

MULCH LAYER

The mulch carpet 20 includes an upper, or primary, layer 27 of natural appearing mulch material 28 which may be particles of inorganic mulch such as granite chips, sand, cement, gravel or the like, or which may be particles or organic mulch such as straw, peat moss, wood chips or the like. Preferably, however, the mulch material 28 is wood bark 30 inherently possessed of insulative cells 31, preservatives such as tannin 32 and an attractive reddish color much admired by landscape architects and gardeners.

The particulate redwood bark, or other tree bark mulch 30, as indicated in FIG. 11, is granulated to particle size and then preferably exposed to a heat of up to about 500°F for a period such as about four seconds in a bark charring oven 33, depending on the amount of pre-heat darkening or charring desired to deepen the original red to a rich dark mahogany hue which will set and be retained for a long time rather than change to silver gray color under the action of the sun's rays. The resulting charred, sterile, color fast, bark particles 34 are then mixed with a suitable plastic binder, for example resin, such as PVC, 35 and delivered to a metering feed hopper 36 of the production apparatus 37. The irregular, rough, three-dimensional, outer surface 22 of the upper mulch layer 27 is obtained by heating the mixture of mulch particles 34 and plastic binder 35 to a temperature of 300°–500°F in a plastic heating oven 38 of the gas flame, or other suitable type, to activate the binder and cause it to encapsulate the mulch particles in a mixture 30 capable of being molded into a predetermined pattern in the pockets, or recesses, 41 of a female pattern mold such as the pattern roll 42.

BACKING LAYER

Figure 8:
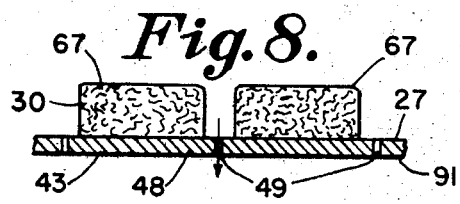
Figure 9:
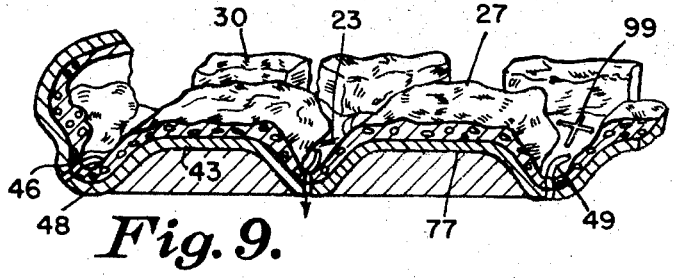

The mulch carpet 20 of the invention also includes a relatively strong, cohesive flexible secondary, or lower, layer 43 of non-rotting material 44 such as man-made synthetic fibres, natural fibres, or films, which may be in sheet, meshed scrim, woven or felted form but which preferably is a mat of intermingled, random length synthetic fibres 45 unified by a suitable binder 46 and having interstices, or pores, 47 permitting transpiration or seepage of moisture therethrough. The backing layer 43 may be economically formed of waste natural, mineral or synthetic fibres, such as nylon, steel wool, or the like and when unified into sheet, or thin mat, configuration with a resin binder has considerable tensile strength, and resistance to tearing, for supplying strength to carpet 20. When lower layer 43 is a plastic film, or sheet 48, the sheet 48 is provided with a multiplicity of short slits 49, or which may be applied by a slitting roll 51, after the carpet is prefabricated so as to register with the bottoms of the grooves 23 in the upper layer 27 (FIGS. 8 and 9).

APPARATUS AND METHOD

As shown diagrammatically in FIG. 11, one embodiment 52 of apparatus for high speed, low cost continuous production of mulch carpet 20 includes a powered conveyor 53, the pattern roll 42 and the wind up roll 54 for advancing the mulch material along a path from the feeding zone 55, through the heating zone 56 and molding zone 57 to the discharge, or wind up, zone 58.

Whether the natural appearing mulch material 28 fed into feed hopper 36 is pea stones, straw, sea weed, peat moss, sea shells, or any of the countless other mulch materials used in various parts of the world, or is the preferred pre-charred, particulate, wood bark mulch 34 of this invention, it is mixed with a plastic binder in hopper 36 and the mixture 39 metered onto the upper stretch 59 of conveyor means 53 in a relatively thick layer of uniform predetermined thickness as at 61. The advancing mixture 39 optionally may be vibrated by powered vibrator 62 which may be polygonal cross section bars such as are used in flocking, or may be any suitable electro-mechanical vibrator, to be sure that there is a layer of the plastic binder powder around and between each mulch particle to encapsulate the same but with the top particles visible through the encapsulation.

The advancing mixture 39 then passes through the heating means 38, such as a gas flame oven which coheres the mixture into a weak, tacky, moldable web 63 which is stripped from the upper stretch 59 by stripper, or doctor, blade 64 which in cooperation with the hard faced pinch-off roll 65 guides the web onto the pocketed surface of pattern roll 42.

The pinch-off roll 65 is adjusted with sufficient clearance to force the heated, tacky mulch layer 63 down into the pockets, or recesses, 41 of the predetermined gravure type pattern 66 of roll 42 while leaving a thin connecting web on the surface of the roll. It will be seen that the deposits of mulch material in each pocket will be solid at this stage as at 67 and connected by a curvilinear web of uniform thickness, as at 68.

A continuous web 71 of the backing material 43 is fed to the patterned surface 66 of pattern roll 42 in the molding zone 57 and into the nip 72 formed between the hard surface 66 of pattern roll 42 and the soft, resilient, deformable surface 73 of a compression roll 74, mounted in suitable adjustable spring loaded bearing mechanism 75 so that the pressure and clearance at nip 72 may be pre-selected and controlled. As explained below, and illustrated in FIGS. 1 to 10 and FIG. 13, the pressure at nip 72 may be only enough to firmly press the lower layer 43, which has been pre-heated in oven 76 into a firm bond with the rear face of the also preheated upper layer 27 so that the plastic binders, in one or both of the layers, unite to form a cohesive, composite backed up mulch carpet 20, the mulch being in solid deposits 67 as in FIGS. 7 and 8. The pressure at nip 72 may alternatively be such as to force both the lower backing layer 43 and the upper mulch layer 27 down into the pockets 41 to undulate both layers into intimate, veneer-like, contact with inverted, dished recesses 77 in the rear face thereof as shown in FIGS. 3 and 9. Preferably, however, the pressure at nip 72, as illustrated in FIG. 13, is such as to distort and deform the rubber-like surfaces 73 of compression roll 74 to press against the rims 78 of the pockets 41 to thin out the mulch layer at the bottom 79 of the channels or grooves 23 formed thereby down to the porous surface of the lower layer thereby creating the moisture passages 47. There is less pressure in the portions 81 of lower layer 43 which bridge the pockets 41 so that a desirable air gap 82 may be formed in each node, or knob, 24 adding to the insulative advantages of carpet 20 for cooling the roots of the plants.

It has been found that the grooves, channels or valleys 23, create flexibility in carpet 20 and that by thinning the bottoms 79 thereof, the carpet does not hump or curl under constant wetting and drying, but remains flat against the contour of the ground, with the slightly dished recesses 77 adding an additional air gap insulation. The rear face of carpet 20 being less irregular than the upper layer surface 22, which is of bark and able to absorb some moisture, causes the carpet to want to grow and expand more on the top side than on the bottom side and the thinned groove bottoms overcome this tendency while isolating each node, or knob, from its neighbor.

It has also been found that hot fibres of the fibrous backing 43, when forced against the rims 78, may be weakened or broken. It is therefore preferred that a light first coat 83 of a suitable binder such as pitch, asphalt, or the like from first spray gun means 84 be applied onto the rear face 85 of upper layer 27, in advance of the backing layer application area and a second light coat 86 thereof from second spray gun means 87 located in rear of the backing layer application area be applied to the rear face 88 of secondary, or lower, layer 43 to thereby prevent damage to the fibres. Also, the pitch serves as an adhesive binder and strengthening medium while providing desirable opacity and since it softens in the sun, permits the carpet 20 to conform to ground contour.

The mulch carpet 20 leaves molding zone 57 as a cohesive web, due to the tensile strength provided by the backing layer 43 and is drawn through discharge zone 58 by the wind up roll 54 which coils the bendable, flexible carpet 20 into a roll 21 capable of storage and handling.

In discharge zone 58 additional treatment means may be provided such as the addition of a plastic film web 91, or a reflective metal foil web 92 or one or more heat sealed plastic tubes 93 having irrigation apertures 94 all applied in the nip 95 of stripping roll 96 with pattern roll 42 and adhered by suitable inherent, or added, adhesive binder or by pitch 86 by the heat of oven 97. Preferably, however, a web of creped or extensible tissue paper 98 is applied in nip 95 which covers the pitch 86 sufficiently to serve as masking material which permits wind-up into a roll but which disintegrates when the mulch carpet is laid in place on the ground. An alternative method is to dust the coating with a fine particulate masking material such as wood bark fines.

In zone 58, the curved slits 49 may be formed in carpet 20 by slitter roll 51 at the same time that cruciform slits 99 are cut to accommodate a predetermined pattern of plantings, and a print roll 101 may also be used to lay out indicia 102 on top or bottom of the carpet for the spacing of plants of different types.

It will be understood that all of the above mentioned rolls, and the conveyor rolls 103, are synchronized and driven by a suitable power train and motor, not shown.

Preferably the pattern roll 42 and the compression roll 74 are hollow, and rotatable in hollow bearings of a well known type, the hollow rolls forming part of a liquid cooling, or chilling, system 104, also of well known type so that once formed in nip 72 the carpet is cooled as it moves around roll 42 for stripping by roll 96.

In FIG. 12 another embodiment of the apparatus is shown in which the pinch roll is eliminated and the compression roll 74 performs both a pinching and pressing function against the pattern roll 42. The mulch material 28 has been pre-formed and fabricated as a roll 105 of mulch particles such as 38, unified and encapsulated by a binder 46 and is fed with the backing material 43, from a supply roll 106, through heating ovens 107 into compression nip 72 for formation of carpet 20. Pattern roll 42 may have a suction system 108 for drawing the deposits, or webs, down into the pockets 41 and stripper roll 96 may be connected to cooling system 104. If a filler 109 is desired such as sand, or cement, 110 to anchor the carpet by weight, or fertilizer 111 to leach into the ground from under the carpet, it is applied from hopper 112 to drop into the dished recesses 77. If such filler is to be deposited in the air gaps, or enclosure 82 of the nodes 24, this may be done by applying the lower layer 43 in rear of the hoppers 112 as shown at 113 in dotted lines.

Figure 2:
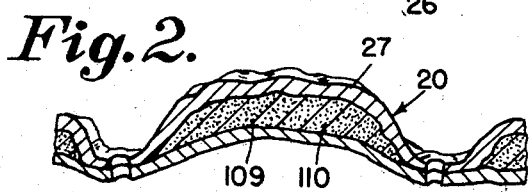
FIGS. 2 through 9 are sectional views similar to FIG. 1 of other embodiments of the invention.
Figure 3:
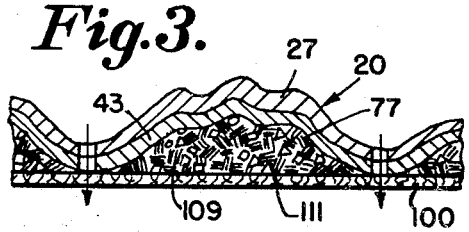

In FIG. 2 a mulch carpet of the invention is shown in which a weight filler 109 such as sand 110 has been incorporated into the enclosures 82.

In FIG. 3 the upper layer 27 and lower layer 43 are in intimate contact as a thin veneer and a heavy filler 109, of trash material such as slag, clay or the like deposited in the recesses 77. A layer of meshed scrim 100 has been adhered to hold the filler in place. The material 109 could be a fertilizer is desired.

Figure 4:
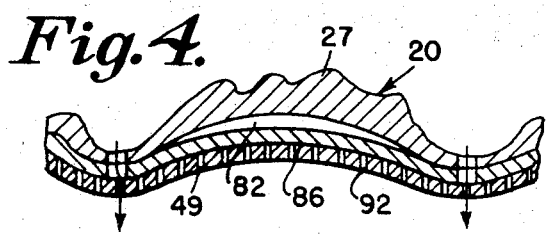

In FIG. 4, the carpet 20 of FIG. 1 is shown, with a layer of reflective metal foil 92 adhered thereto by the pitch 86. the air gap 82 is also shown in this view and the foil is shown slitted with the slits 49.

Figure 5:
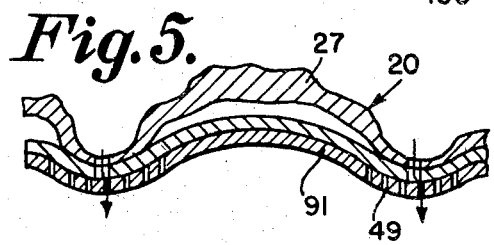

In FIG. 5 a layer has been added to the carpet of FIG. 1 formed of plastic film or sheeting 91, which tends to lengthen the life of the carpet and which must be slitted as at 49 to permit seepage.

Figure 6:
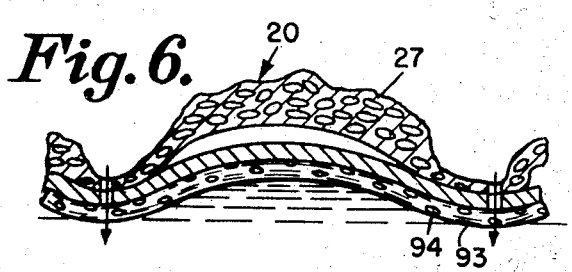

In FIG. 6 the carpet of FIG. 1 is shown, with the particles and encapsulations illustrated, on a greatly enlarged scale. A heat sealed elongated plastic tube 93 with irrigation apertures 94 is shown adhered to the carpet 20.

Figure 7:
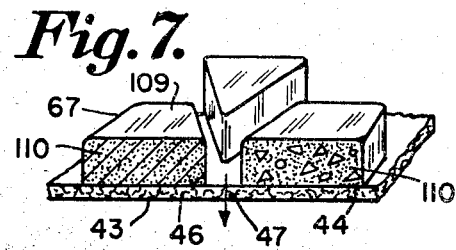

FIG. 7 illustrates a form of the carpet 20 in which the mulch material is a solid, irregular deposit of sand or cement 110, unified by phenolic resin, PVC or other binder and pattern printed on a porous fibrous sheet 43, so that the bottoms 79 of the grooves 23 guide rainwater to the interstices 47 of the porous sheet. FIG. 8 is somewhat similar except that the deposits or nodes are of organic, more natural appearing material such as 30 and the lower layer is a plastic film 91, provided with curved slits which register with the bottoms of the grooves.

FIG. 9 illustrates a carpet in which the top layer is of organic natural appearing mulch material 30 and the lower layer is a more cohesive backing layer 43 with curved slits 49 in the grooves, but veneered to form recesses 77 for a suitable filler.

Figure 10:
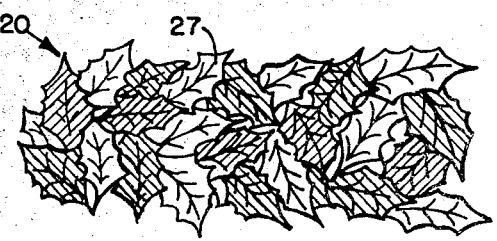
FIG. 10 is a plan view of a leaf pattern for the three-dimensional surface of the mulch carpet.

In FIG. 10 the upper layer 27 of the carpet 20 is shown with a predetermined irregular pattern in the form of leaves shingled in arrangement, but having the grooves, or spaces, in the surface, required for moisture.

Figure 14:
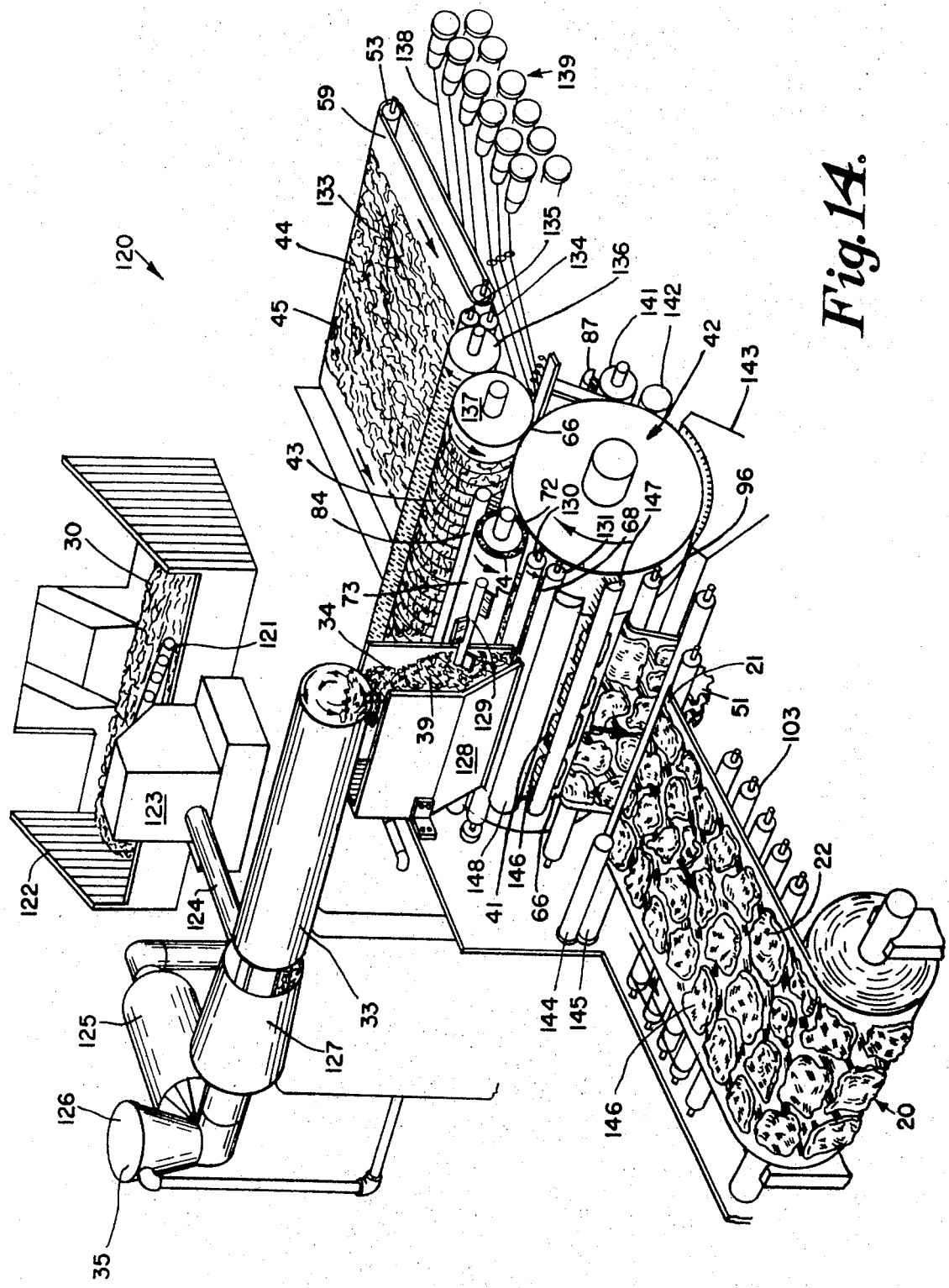
FIG. 14 is a diagrammatic, perspective view of the preferred embodiment of the apparatus of the invention.

In FIG. 14, the preferred embodiment 120 of the apparatus of the invention is illustrated. As shown, the wood bark 30 is fed by conveyor 121 from bin 122 to grinder 123 and reduced to the desired size of particle. The particles are then advanced by blower 124 into dryer 125 which may be direct gas heat at 212°–220°F, and thence into the metering chamber 126 into which the resin binder 35 is fed for mixing. The mixture then passes through mixer 127 and wood bark charring oven 33, the dwell in the oven ranging from four seconds to 2 minutes at 300°–500°F, so that the charred particles 34 fall into the heated feed hopper 128 which serves to heat the binder in the plastic mulch mixture 39.

The hopper 128 has an agitator 129 and a pair of chip grap rolls 130 and 131, corresponding to the pinch off roll 65, which guide the material into the pockets, or recesses, 41 of the patterned surface 66 of the pattern roll, or mold drum, 42, the drum rotating in the direction of the arrows. A continuous web 68 of the mulch material is preferably formed which may be thick or thin, as desired. The mixture then is received in the nip 72 of the soft resilient surface 73 of compression roll 74, with the hard face of pattern roll 42, and is then sprayed by the asphalt spray heads 84. Asphalt converts fibres subject to rotting into non-rotting material.

The secondary, backing or lower layer 43 is formed by the natural, mineral, or synthetic fibres 45 which are preferably about one-third of a pound to the square yard and from about ⅜ of an inch to about 4 inches in length. Fibrous mat 133 is advanced by conveyor 53 into the nip of rolls 134 and 135, the fibres being picked up by lickerin roll 136 and then by vacuum roll 137, which guides the fibrous mat held on the roll by the longitudinal strengthening strands 138 from thread supply 139, into contact with the spray coated face of the mulch web.

The composite material is again spray coated with a suitable binder, such as asphalt, pitch, tar or the like by spray means 87, and masking material such as tissue paper or wood bark fines is applied at 141. A soft compression roll 142 is then applied and the web then passes through a set of cooling spray heads 143 to fog, or mist, the web to cool it for stripping by the stripping roll 96. The web then may be subjected to slitting by cutter discs and an anvil roll as at 51, and thence through nip rolls 144 and 145 and along conveyor rolls 103 to a wind-up roll. The patterned surface 66 may be in the form of mold segments 146, which are cooled by cooling spray heads 147 and subjected to suction from box 148 to remove any moisture prior to reaching the hopper 128.

It will be understood that brick dust, black slate dust or other coloring particles may be deposited in the recesses 41 just in advance of hopper 128 to provide a natural color effect. Also that similar coloring material may be adhered to the nodes, or protruberances of the rough, grooved, mulch material after it is formed for desirable color effects.

What is claimed is:

1. Apparatus for making elongated webs of artificial mulch material from wood bark, said apparatus comprising:

means for grinding redwood bark into particles, drying said particles and delivering the same to a charring oven charring oven means for heating said particles to a predetermined temperature;

conveyor means advancing along a path from a feeding zone, through a heating zone and a molding zone into a discharge zone;

hopper means in said feeding zone for continuously receiving said charred, ground particles and metering a mixture of said particles and a plastic binder onto said conveyor;

heating means along said path, in said heating zone, for activating said plastic binder to form a heated, semicohesive layer of said mixture;

molding means along said path in said molding zone, including a rotatable, hard, pocketed pattern roll forming a nip with a hard pinch-off roll, for pressing said layer into an irregular, grooved, random pattern on one face to simulate natural mulch the pockets of said roll having rims therearound;

means for supplying a strong, non-tearable backing of relatively high tensile strength to said molding zone;

compression roll means along said path for pressing said strong, non-tearable backing on the other face of said molded mulch layer; and stripping means along said path in said discharge zone for stripping said web from said moving pocketed surface.

2. Apparatus as specified in claim 1, wherein:

said compression roll means includes a roll with a distortable, resilient, soft surface, such as of rubber in pressure nip contact with said layer on said pattern roll, and mechanism for adjusting the compression thereof against said pattern roll; whereby the relationship of the backing layers to the mulch layers in said pockets may be adjusted to selectively achieve a solid deposit on a rectilinear layer, or two spaced apart concaved layers or two intimately contacting concaved layers.

3. Apparatus as specified in claim 1, wherein:

said backing is a thin strong mat of non-rotting fibres bound to each other with open interstices therebetween; and said compression roll means includes a rubber roll in pressure nip contact with said layer on said pattern roll and cooperating with the edges, or rims, of the pockets of said pattern roll to thin out said mulch layer to pass moisture therethrough into said open interstices in said backing layer.

4. Apparatus as specified in claim 1, plus:

rotating cutter roll means along said path in said discharge zone for slitting said web in a preselected pattern.

5. Apparatus as specified in claim 1, plus:

rotating printing roll means along said path in said discharge zone for marking a pattern of indicia on said web to indicate proper spacing of plant slits for various types of plants.

6. Apparatus as specified in claim 2, wherein:

said compression roll and said pattern roll are each hollow; and said apparatus includes a cooling fluid circulation system including said hollow rolls for cooling said web after application of said backing and prior to stripping said web from said pattern roll.

7. Apparatus as specified in claim 1, plus:

first spray means along said path in advance of said compression zone for spraying asphalt on the back of said molded layer to adhere said backing; and second spray means along said path in rear of said compression zone for spraying asphalt on the back of said backing to adhere a masking, or covering, layer on said backing.

8. Apparatus for making an elongated web of artificial mulch carpet material from ground, natural wood bark particles, and resin binder said apparatus comprising powered mechanism defining a path from a mixing zone through a feeding zone, a heating zone and a molding zone to a discharge zone;

combined mixing and conveying means in said mixing zone continuously forming a mixture of dry, ground, natural, wood bark particles, resin and plasticizer and delivering said mixture into said feeding zone;

feeding hopper means in said feeding zone, receiving said mixture and continuously delivering the same in sheet form into said heating zone;

heating oven means in said heating zone for receiving said sheet formed mixture, activating said resin binder and delivering a heated, moldable, semi-cohesive layer thereof into said molding zone;

molding means, comprising a hard, pocketed, rotating pattern roll forming a nip with a hard, pinch-off roll, in said molding zone, for receiving said heated, moldable layer and pressing the same into a layer of predetermined thickness having an irregular, grooved, random pattern on one face and a smooth generally planar surface on the other face backing supply means proximate said molding zone for continuously supplying a backing web of strong, non-tearable, air pervious backing material into said molding zone;

compression roll means in said molding zone, including a resilient, spring pressed rubber roll in nip contact with said heated, smooth generally planar other face, in rear of said pinch roll on said path, for applying said backing under pressure to the said other face for reinforcing said web; and stripping means in said discharge zone for stripping said backed, pattern molded web from said pattern roll.

9. In rotary embossing apparatus of the type having an oven for heating a mixture of material and binder and a conveyor for advancing the heated mixture into the nip of an embossing roll and another roll the improvement comprising:

pre-heating means for continuously heating natural, redwood bark for a predetermined period at a predetermined temperature to char said bark for retaining its reddish hue;

mixing means for receiving said pre-heated, charred redwood bark from said pre-heating means, mixing the same with resin and plasticizer and discharging said mixture onto said conveyor;

a heating oven associated with said conveyor for activating the binder in said mixture to adhere said bark into a cohesive layer;

means for supplying a strong, non-tearable, reinforcing backing to the exposed face of said layer on said embossing roll and adhering the same thereto; and slitting means mounted along the path of said backing-reinforced layer for forming slits therein.

10. Apparatus as specified in claim 9 wherein:

said backing supply means includes a compression roll, having a resilient, yieldable surface, in pressure nip contact with said embossing roll and spring pressure means operably connected to said compression roll for applying the same with uniform spring pressure.

11. Apparatus as specified in claim 9 plus vibrator hopper feeding means interposed between said mixing means and said conveyor, for receiving said mixture and vibratory discharging the same in a relatively thick layer of uniform thickness on said conveyor whereby said bark particles are encapsulated in said binder.

* * * * *